US009496958B1

(12) United States Patent
Bryskin et al.

(10) Patent No.: US 9,496,958 B1
(45) Date of Patent: Nov. 15, 2016

(54) METHOD AND APPARATUS FOR TRAFFIC ENGINEERING ON AN OPTICAL TRANSPORT NETWORK

(71) Applicant: ADVA Optical Networking SE, Meiningen (DE)

(72) Inventors: Igor Bryskin, Great Falls, VA (US); Aihua Guo, Clifton, VA (US)

(73) Assignee: ADVA OPTICAL NETWORKING SE, Meiningen (DE)

( * ) Notice: Subject to any disclaimer, the term of this patent is extended or adjusted under 35 U.S.C. 154(b) by 0 days.

(21) Appl. No.: 14/817,377

(22) Filed: Aug. 4, 2015

(51) Int. Cl.
*H04B 10/00* (2013.01)
*H04B 10/27* (2013.01)
*H04Q 11/00* (2006.01)

(52) U.S. Cl.
CPC .......... *H04B 10/27* (2013.01); *H04Q 11/0062* (2013.01)

(58) Field of Classification Search
CPC ............................ H04B 10/27; H04Q 11/0062
See application file for complete search history.

(56) References Cited

U.S. PATENT DOCUMENTS

| | | | | |
|---|---|---|---|---|
| 9,236,969 | B2* | 1/2016 | Valiveti | H04J 3/1652 |
| 2009/0074414 | A1* | 3/2009 | Miles | H04J 14/0223 398/75 |
| 2012/0224857 | A1* | 9/2012 | Su | H04J 3/1652 398/98 |
| 2013/0108273 | A1* | 5/2013 | Valiveti | H04J 3/1652 398/79 |
| 2013/0128936 | A1* | 5/2013 | Kennard | H04L 5/14 375/222 |
| 2013/0259465 | A1* | 10/2013 | Blair | H04B 10/27 398/2 |
| 2014/0247829 | A1* | 9/2014 | Gautam | H04L 29/0653 370/392 |
| 2015/0036971 | A1* | 2/2015 | Way | G02B 6/35 385/17 |
| 2015/0131989 | A1* | 5/2015 | Syed | H04L 41/0803 398/45 |
| 2015/0131997 | A1* | 5/2015 | Syed | H04Q 11/0066 398/69 |
| 2016/0087739 | A1* | 3/2016 | Kametani | H04J 3/0691 398/56 |
| 2016/0164596 | A1* | 6/2016 | Rao | H04B 10/032 398/5 |
| 2016/0173964 | A1* | 6/2016 | Weldon | H04J 14/02 398/48 |

* cited by examiner

*Primary Examiner* — Danny Leung
(74) *Attorney, Agent, or Firm* — Michael G. Johnston; Moore & Van Allen PLLC

(57) ABSTRACT

A method for traffic engineering on an optical transport network, OTN, comprising network elements implementing asymmetric OTN switches, said method comprising discovering by each network element of said network ODUk containers available on each of locally terminated traffic engineering, TE, links and identifying the switching limitations of the discovered ODUk containers with respect to how said ODUk containers are switchable onto the ODUk containers available on other locally terminated TE links; identifying by said network element groups of ODUk containers available on a given TE link exhibiting identical switching limitations; negotiating by said network element with its neighboring network elements properties of to be advertised child TE links each associated with a separate ODUk group; and advertising by said network element for each identified group of ODUk containers a separate child TE link parallel to the original parent TE link, wherein each advertised child TE link indicates the total number of available ODUk containers within the respective ODUk group along with the identified switching limitations exhibited by the ODUk containers of said ODUk group and wherein the re-advertised parent TE link indicates the number of available ODUk containers reduced to account for the ODUk containers associated with the separately advertised child TE links.

13 Claims, 6 Drawing Sheets

METHOD AND APPARATUS FOR TRAFFIC ENGINEERING ON AN OPTICAL TRANSPORT NETWORK

FIELD OF THE INVENTION

The invention relates to a method and apparatus for traffic engineering on an optical transport network, OTN, comprising network elements implementing asymmetric OTN switches.

TECHNICAL BACKGROUND

An optical transport network, OTN, comprises optical network elements connected by optical fiber links. An optical transport network provides transport, multiplexing, switching, management and supervision of optical trails carrying client data. Optical transport networks have been migrating from SONET technology to a wavelength division multiplexing, WDM, architecture which allows to carry multiple wavelengths over a single fiber.

Traffic engineering, TE, is the process of selecting a path for routing a given connection from a source network element to a destination network element such that the selected path satisfies constraints of the given connection by simultaneously optimizing the network resource utilization and avoiding traffic congestion. Traffic engineering on a transport network such as an OTN/ODUk layer network presents many challenges. One such challenge is the complexity of managing network elements that make up the transport network. A further challenge for traffic engineering is the amount of information about network elements and links interconnecting them that needs to be constantly rediscovered and redistributed to traffic engineering applications such as path computers in real time. As a consequence of the high amount of information and data, the necessary size of traffic engineering databases increases and therefore memory and computation power requirements are high, especially considering the complexity of required path computation algorithms. Moreover, the service paths often need to be computed in real time, in particular in the context of applications such as network failure service recovery. The growth in size of the network increases the challenges for traffic engineering exponentially.

Packet-switched layer networks can be considered as built of symmetrical non-blocking switches. Such a symmetrical non-blocking switch can receive a service traffic over one of its interfaces and send it out over any other its interface with no limitations and with the same effect on the respective quality of service such as packet loss ratio or delay. Path computation and traffic engineering on networks made of interconnected symmetrical non-blocking switches are relatively simple tasks. Specifically, there is no traffic engineering information required to be advertised on per network element basis, and there are only few simple attributes that need to be advertised on per link basis. These attributes can include for instance unreserved bandwidth and TE metrics. Furthermore, the advertisements need neither to be accurate nor frequent. The employed path computation algorithms are relatively simple and can be performed on a roughly up-to-date traffic engineering database, TED.

In contrast, network elements making up a circuit-switched transport network often exhibit switching limitations and hence, generally speaking, must be considered as blocking switches. A fixed optical add-drop multiplexer (FOADM) in a WDM layer or cascaded ADM in a OTN/ODUk layer network, when receiving a service traffic on one of its interfaces, often can switch it onto a subset of It's interfaces, but not to any other interface.

This circumstance complicates traffic engineering in two ways. First, information about switchable interface combinations of each network element needs to be made known to the path computer or otherwise nothing can prevent the path computation process to select non-provisional paths. This is usually solved by having network elements advertise their interface connectivity matrices explicitly describing valid and/or invalid interface switching combinations. Second, path computation algorithms need to be adjusted accordingly to deal with the advertised network element interface connectivity matrices.

Traffic engineering gets even more complex when the abovementioned switching limitations exhibited by a given network element happen not on an interface level, but on individual atomic resource level. Specifically, it is possible that a given wavelength channel on a given inbound WDM layer FOADM interface can be switched onto one set of the FOADM's outbound interfaces, while another wavelength channel, belonging to the same inbound interface, can be switched onto a different set of the FOADM's outbound interfaces. Likewise, it can be possible that a given ODUk container on a given inbound OTN cascade's interface can be switched onto one set of the cascade's outbound interfaces, while another ODUk container, belonging to the same inbound interface, can be switched onto a different set of the cascade's outbound interfaces.

This individual resource switching limitation can be overcome by advertising every individual resource separately with an explicit specification of the resource's switching capabilities as one of the resource's advertised attributes. Such a conventional approach can make sense in WDM layer networks, however is not applicable to OTN/ODUk layer networks. The reason for this is that WDM layer atomic resources (wavelength channels) of a WDM layer network are not hierarchical in nature (wavelength channels cannot carry other wavelength channels), and the number of wavelength channels per interface is relatively small. Further, in a WDM layer network, there are other reasons as to why it is important to advertise each wavelength channel individually. For instance, this is done to honor wavelength continuity constraints and to be able to compute wavelength specific optical impairments constraints.

In contrast, in an OTN/ODUk layer network, the individual resources are hierarchical. For example, an ODU2 container can carry ODU1 containers, which in turn can carry ODU0 containers. There can be potentially a big number of ODUk containers associated with a given interface of the network element. Consequently, advertising each container individually is likely to cause grave scalability issues. Furthermore, if not for the switching limitations, there is no reason to advertise each container individually. Instead, just relatively infrequent advertising of rough total numbers of available containers on per container type basis would suffice for path computation.

Accordingly, there is a need for a method and apparatus for traffic engineering on an optical transport network which allows to honor individual ODUk containers switching limitations without the necessity of advertising each ODUk container on every OTN/ODUk link individually.

SUMMARY OF THE INVENTION

The invention provides according to a first aspect a method for traffic engineering on an optical transport network, OTN, comprising network elements implementing asymmetric OTN switches, said method comprising:

discovering by each network element of said network ODUk containers available on each of locally terminated traffic engineering, TE, links and identifying the switching limitations of the discovered ODUk containers with respect to how said ODUk containers are switchable onto the ODUk containers of the same type available on other locally terminated TE links, identifying by said network element groups of ODUk containers available on a given TE link exhibiting identical with respect to said TE links switching limitations, negotiating by said network element with its neighboring network elements properties of to be advertised child TE links each associated with a separate said ODUk group, and advertising by said network element for each identified group of ODUk containers a separate child TE link parallel to the original parent TE link, wherein each advertised child TE link indicates the total number of available ODUk containers within the respective ODUk group along with the identified switching limitations exhibited by the ODUk containers of said ODUk group and wherein the re-advertised parent TE link indicates the number of available ODUk containers reduced to account for the ODUk containers associated with the separately advertised child TE links.

In a possible embodiment of the method according to the first aspect of the present invention, the child TE links and parent TE links are advertised using an instance of the OSPF-TE protocol.

In a further possible embodiment of the method according to the first aspect of the present invention, the child TE links are advertised using the ISIS-TE protocol.

In a further possible embodiment of the method according to the first aspect of the present invention, the advertised TE data is stored in a traffic engineering, TE, database.

In a still further possible embodiment of the method according to the first aspect of the present invention, a service path is computed on the basis of the TE data stored in the TE database.

In a still further possible embodiment of the method according to the first aspect of the present invention, the ODUk containers identify atomic network resources of an ODU layer of said OTN network and the granularity at which bandwidth can be allocated for a given OTN service.

In a further possible embodiment of the method according to the first aspect of the present invention, the OTN network is controlled by a GMPLS control plane.

The invention further provides according to a second aspect a network element of an OTN network having traffic engineering, TE, and data links connecting said network element to other network elements of said OTN network, said network element comprising:

a resource auto-discovering unit adapted to discover ODUk containers available on each of its TE links terminated by said network element and to identify switching limitations of the discovered ODUk containers, a resource grouping unit adapted to identify groups of ODUk containers exhibiting identical switching limitations with respect to associated TE links hosting said ODUk containers, a link resource management unit adapted to negotiate with neighboring in the OTN layer network elements properties of to be advertised child TE links terminated by said network element, and an advertising unit adapted to advertise for each identified group of ODUk containers a separate child TE link parallel to the original parent TE link terminated by said network element, wherein each advertised child TE link indicates the total number of available ODUk containers within the respective ODUk group and the identified switching limitations exhibited by the ODUk containers of said ODUk group and wherein the re-advertised parent TE link indicates the number of available ODUk containers reduced to account for the ODUk containers associated with the separately advertised child TE links.

In a possible embodiment of the network element according to the second aspect of the present invention, the ODUk containers are atomic network resources of an ODU layer of said OTN network, wherein said resources define the granularity at which bandwidth can be allocated for the services provided by said OTN network.

In a possible embodiment of the network element according to the second aspect of the present invention, the OTN network is controlled by a GMPLS control plane.

In a further possible embodiment of the network element according to the second aspect of the present invention, the network element is adapted to implement at least one asymmetric OTN switch.

In a further possible embodiment of the network element according to the second aspect of the present invention, the OTN switch is connected to OTN multiplexers of said network element.

The invention further provides according to a third aspect an optical transport network, OTN, comprising network elements implementing asymmetric OTN switches, wherein at least some or each network element comprises: a resource auto-discovering unit adapted to discover ODUk containers available on each of its TE links terminated by said network element and to identify switching limitations of the discovered ODUk containers, a resource grouping unit adapted to identify groups of ODUk containers exhibiting identical switching limitations with respect to hosting TE links, a link resource management unit adapted to negotiate with neighboring network elements properties of to be advertised child TE links terminated by said network element, and an advertising unit adapted to advertise for each identified group of ODUk containers a separate child TE link parallel to the original parent TE link terminated by said network element.

In a possible embodiment of the optical transport network according to the third aspect of the present invention, the OTN network is controlled by a GMPLS control plane.

In the following, possible embodiments of the method and apparatus for traffic engineering on an optical transport network are described in more detail with reference to the enclosed figures.

Figure 1:
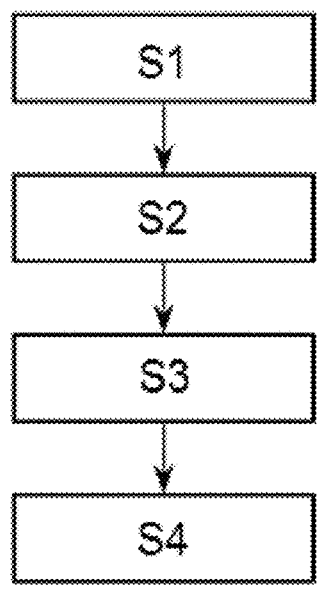
FIG. 1 shows a flowchart of a possible exemplary embodiment of a method for traffic engineering of an optical transport network according to the first aspect of the present invention.

As illustrated in the flowchart of FIG. 1, the method for traffic engineering of an optical transport network, OTN, according to the first aspect of the present invention comprises several steps.

Figure 3:
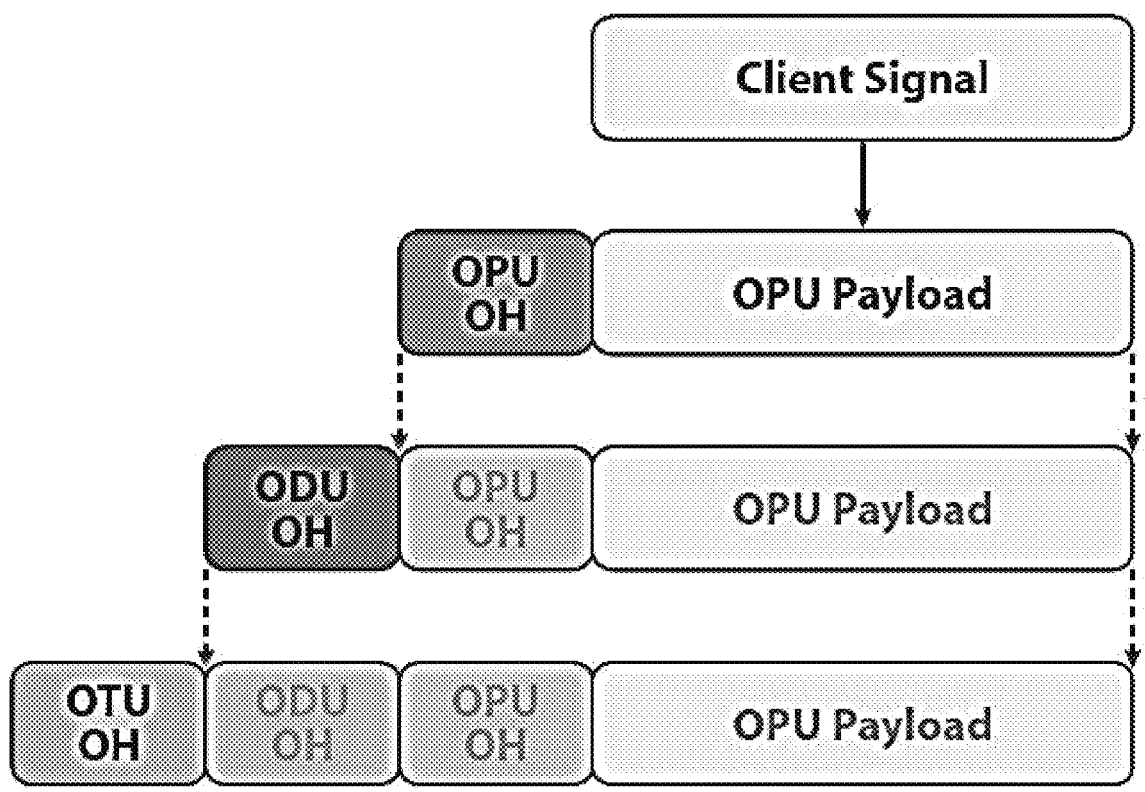
FIG. 3 shows the structure of an OTN container within an optical transport network to illustrate the operation of the method and apparatus according to different aspects of the present invention.

In a first step S1, a network element, NE, of the optical transport network, OTN, discovers ODUk containers on each of locally terminated traffic engineering, TE, links and identifies the switching limitations of the discovered ODUk containers with respect to how said ODUk containers are switchable onto the ODUk containers available on other locally terminated TE links. The network element, NE, participating in the OTN/ODUk layer network auto-discovers all ODUk containers available on each of its OTN/ODUk interfaces. Further, switching limitations for each of the discovered ODUk containers are identified. FIG. 3 shows a data structure of an ODUk container.

In a further step S2, groups of ODUk containers available on a given TE link exhibiting identical switching limitations are identified by the network element. ODUk containers auto-discovered on a given TE link exhibit identical switching limitations if they can be switched onto an identical set of other parent TE links. Groups of ODUk containers exhibiting the same size of interfaces they can be switched onto are identified for every network element OTN/ODUk interface.

In a further step S3, the network element, NE, negotiates with its neighboring network elements properties of to be advertised child TE links each associated with a separate ODUk group.

In a further step S4, the network element, NE, advertises for each identified group of ODUk containers a separate child TE link parallel to the original parent TE link. Each advertised child TE link indicates the total number of available ODUk containers within the respective ODUk group along with identified switching limitations exhibited by the ODUk containers of the ODUk group. The re-advertised parent TE link indicates the number of available ODUk containers reduced to account for the ODUk containers associated with the separately advertised child TE links.

The advertisement of the child TE links contains, among other things, total numbers of ODUk containers in the group on per container type basis and the group's switching limitations being common to all ODUk containers in the ODUk container group. Prior to, or after the initial advertisement, both nodes or network elements terminating the child network TE link agree on a common group of ODUk containers advertised on the child TE link. The parent TE link advertises numbers of available ODUk containers reduced to account for those ODUk containers that are advertised separately for the parallel child TE links.

Figure 4:
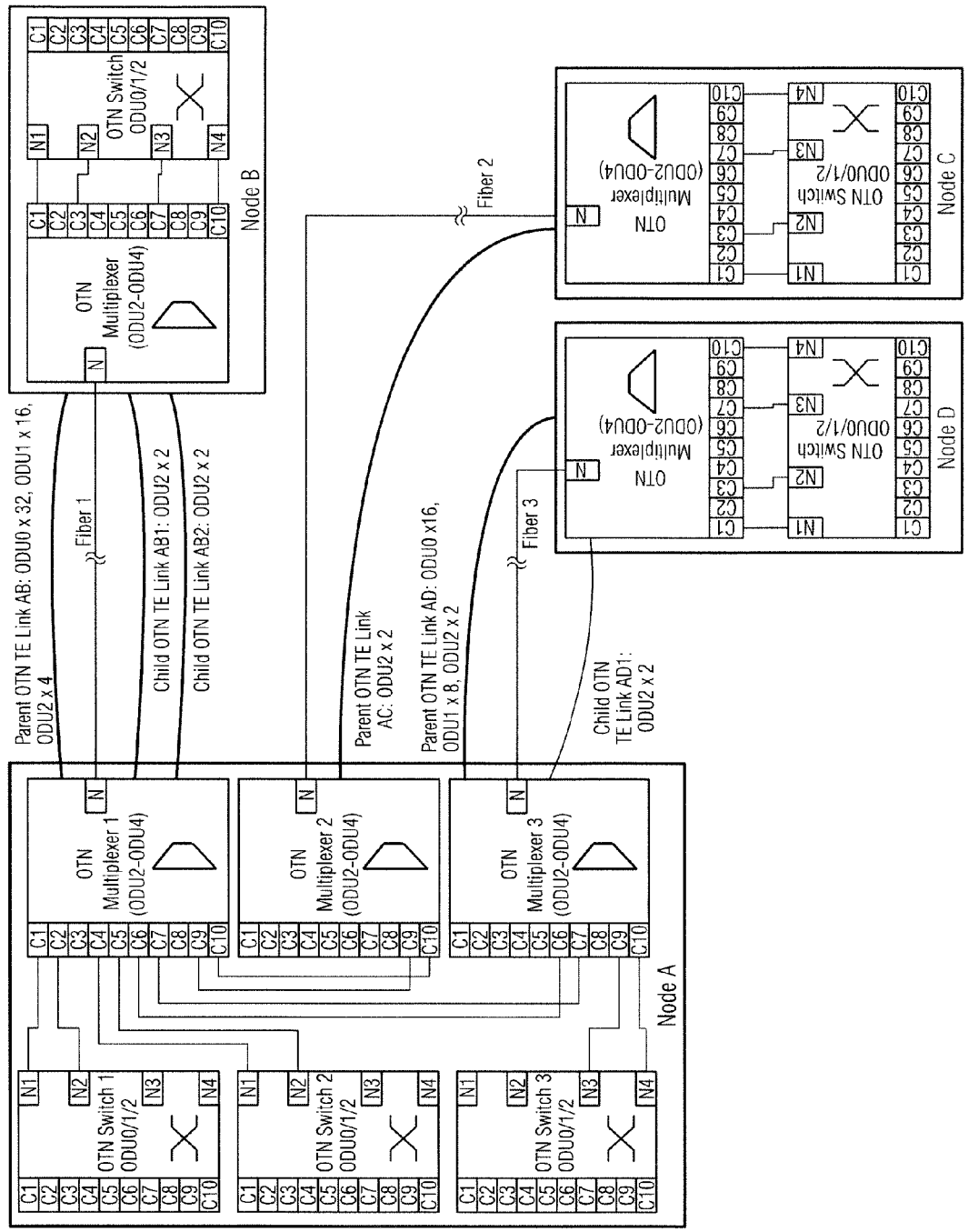
FIG. 4 shows the physical topology of an exemplary OTN/ODUk layer network to illustrate the operation of the method and apparatus according to the different aspects of the present invention.

FIG. 4 illustrates the physical topology of an exemplary OTN/ODUk layer network for illustrating the operation of a method for traffic engineering, TE, on an optical transport network, OTN, according to the first aspect of the present invention as shown in FIG. 1. The method as shown in FIG. 1 introduces a concept of inverse link bundling, ILB, and implements an ILB-based method of traffic engineering on an optical transport network, OTN, comprising asymmetric OTN switches. The method according to the first aspect of the present invention strikes a balance between the accuracy of path selection algorithms required for dynamic manipulation of transport services on the one hand and on the other hand the amount of required traffic engineering, TE, information that needs to be made available to these path selection algorithms. Link bundling, LB, is a well-known and widely implemented traffic engineering, TE, technique. It allows in a given layer network for advertising multiple parallel traffic engineering links with identical characteristics as a single bundled traffic engineering link whose bandwidth is advertised as a summary of bandwidths available on each of its components. Because of the reduced amount of advertisements (less number of links), the conventional link bundling, LB, improves the scalability of network configurations with a large number of parallel links. The method for traffic engineering of an optical transport network, OTN, according to the first aspect of the present invention performs the opposite to link bundling, i.e. it advertises a single traffic engineering, TE, link as a set of parallel traffic engineering, TE, links (inverse link bundling, ILB).

In the exemplary OTN network as illustrated in FIG. 4, a network element or node A is connected to network element node B through an optical fiber F1, to a further network element (node C) through an optical fiber F2 and to another optical network element (node D) through an optical fiber F3. The optical network element node A is made of an OTN switching card capable of switching lower order ODUk containers, ODU0, ODU1 and ODU2. Node A further comprises high order OTN multiplexers MUX1, MUX2, MUX3 that can multiplex up to ten ODU2 containers into one ODU4 container to be wrapped and transported in an ODU4 signal over the optical fiber.

Each ODU2 container from port Cx of an OTN multiplexer is multiplexed into a fixed ODU2$x$ time slot in an ODU4 container. Inside node A, the lower order OTN switches and the high order OTN multiplexers are fiber-cascaded in a way that ODU2 time slot 6 and 7 (from port C6 and C7, respectively) on optical fiber F1 are demultiplexed and multiplexed into ODU2 time slot 7 and 8 on optical fiber F3, while ODU2 time slot 9 and 10 are demultiplexed and multiplexed into ODU2 time slot 9 and 10 on optical fiber F2. As can be seen in FIG. 4, ports C1, C2, C4, C5 on OTN multiplexer MUX1 and ports C9, C10 of OTN multiplexer MUX3 are fiber-connected to their respective lower order OTN switches, thus up to 32 ODU0 containers or 16 ODU1 containers, or 4 ODU2 containers can be add-dropped on optical fiber F1.

Figure 5:
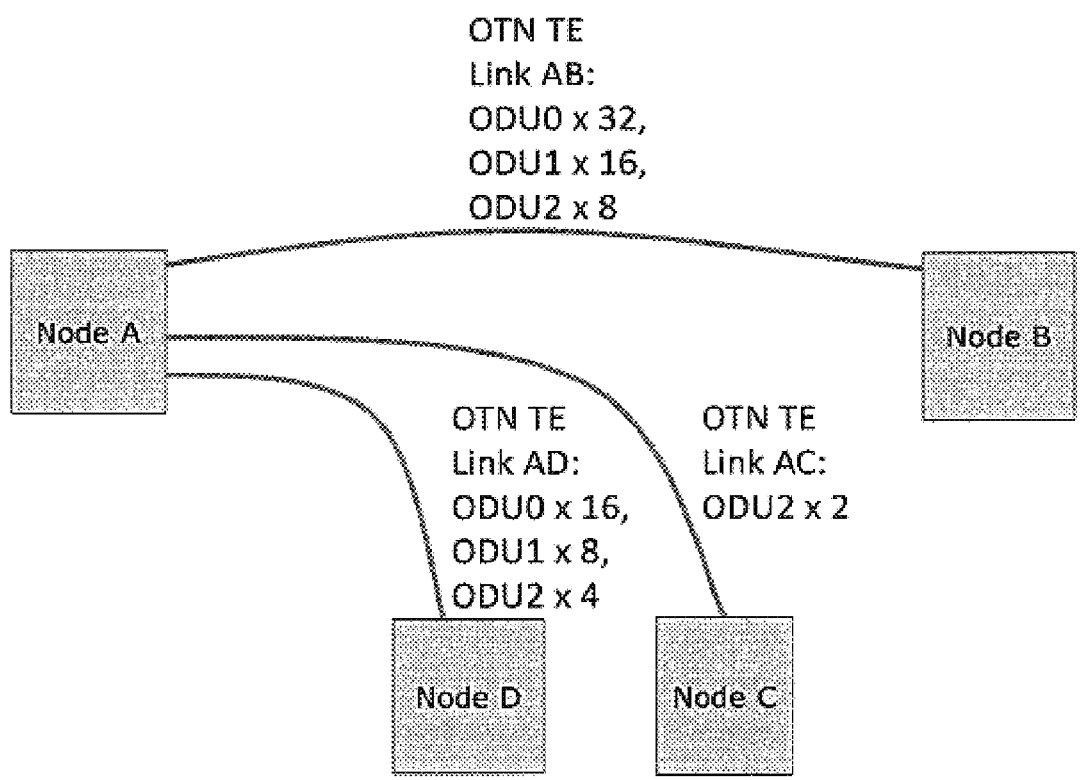
FIG. 5 shows a traffic engineering topology of the network shown in FIG. 4 without inverse link bundling.

FIG. 5 illustrates the traffic engineering, TE, topology of the exemplary OTN network without inverse link bundling, ILB. As can be seen, the conventional TE topology consists of four TE nodes, i.e. nodes or network elements A, B, C and D as well as three traffic engineering, TE, links, i.e. AB, AC, and AD, wherein node A advertises for TE link AB up to 32 ODU0s, 16 ODU1s and 8 ODU2s, for TE link AC up to 2 ODU2s, and for TE link AD up to 16 ODU0s, 8 ODU1, and 4 ODU2s. The traffic engineering, TE, topology without inverse link bundling as illustrated in FIG. 5 captures information about basic TE topological components such as TE links and nodes as well as resource availabilities on each TE link in terms of numbers of available ODUk containers on per container type basis. However, the conventional TE topology without inverse link bundling as illustrated in FIG. 5 cannot express switching limitations of a node such as node A in terms of the node's links, because different groups of atomic resources (ODUk containers) associated with the same TE link (such as link AB) exhibit different switching limitations (i.e. some can be switched onto TE link AD, but some can be switched onto link AC). Consequently, if a path computer selects a path (e.g. BA-AC) and lets the service provisioning process to dynamically assign for the service using the path ODUk containers on the path links, it is possible that the assigned ODUk containers because of the unaccounted switching limitations will not be able to get bound into the cross-connect on node A. This obstacle can only be overcome if each ODUk container is advertised separately with an explicit specification of its switching limitations. However, given potentially large numbers of ODUk containers available on each OTN link such a conventional approach does not scale.

Figure 6:
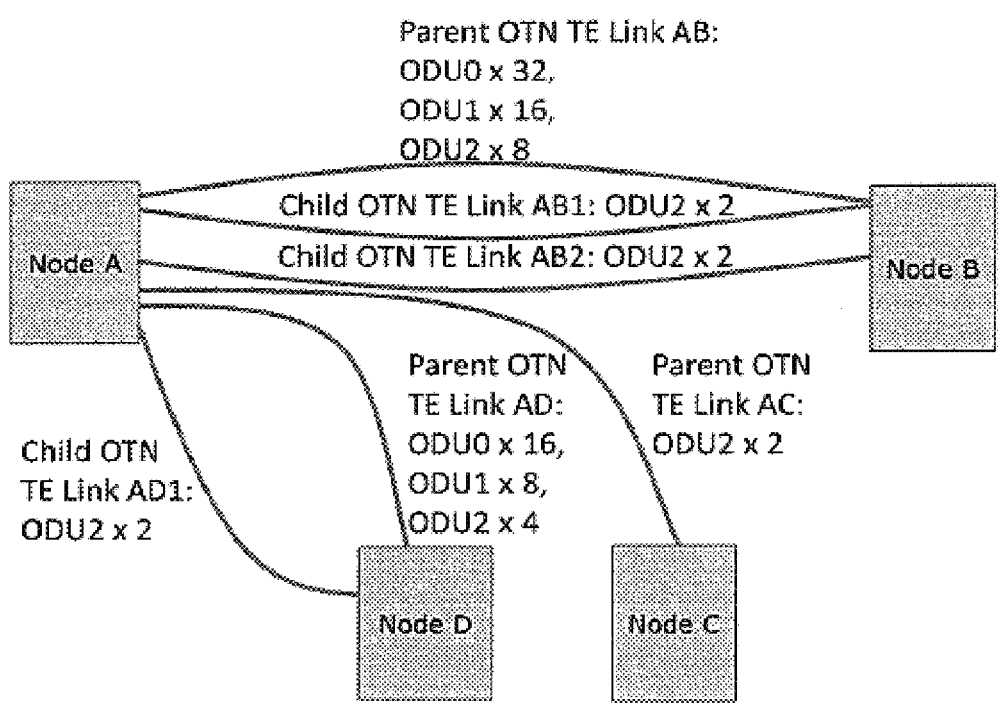
FIG. 6 shows the traffic engineering, TE, topology of the network shown in FIG. 4 with inverse link bundling.

Therefore, the method for traffic engineering, TE, of an optical transport network, OTN, according to the first aspect of the present invention as illustrated in the flowchart of FIG. 1 provides a traffic engineering, TE, topology with inverse link bundling, ILB, as illustrated in FIG. 6. Each network element or traffic engineering node of the network discovers ODUk containers available on each of locally terminated traffic engineering, TE, links and identifies the switching limitations of the discovered ODUk containers with respect to how said ODUk containers are switchable onto the ODUk containers available on other locally terminated TE links. Each TE node or network element identifies for each TE link groups of ODUk containers that can be switched onto the same set of the network elements TE links. For example, network element, NE, or node A discovers that one group of ODUk containers available on TE link AB can be switched only onto TE link AC, whereas another group of ODUk containers can be switched only onto TE link AD, and a third group of ODUk containers exhibits no switching limitations, i.e. can be switched onto either the TE link AD or to the TE link AC.

For each group of ODUk containers that exhibit the same switching limitations, the TE node in question negotiates with its neighboring peer TE nodes and advertises a set of parallel child TE links (one per each group). In the exemplary network, node A advertises two child TE links parallel to original parent TE link AB, and one child TE link parallel to original parent TE link AD, as shown in FIG. 6.

Each child TE link advertises only the total numbers of available ODUk containers (one number per ODUk type) associated with the respective child TE link/group. Each parent TE link advertises the total numbers of available ODUk containers reduced to account for the ODUk containers associated with the child TE links. For example, the numbers of available ODUk containers advertised by TE link AB is reduced such that it does not include ODUk containers advertised for the two parallel child TE links. Switching limitations of child TE links (common to all ODUk containers associated with them) are advertised on a link basis. For example, network element node A advertises that child TE link AB1 can be only switched onto link AD.

The goal of the inverse link bundling, ILB, as performed by the method for traffic engineering, TE, according to the first aspect of the present invention is to eliminate the advertisement of TE links that are associated with ODUk containers with different switching limitations. This allows for a path computer to remain oblivious of individual ODUk containers while computing paths honoring all switching limitations imposed by the network elements or nodes. The inverse link bundling, ILB, technique as implemented by the method for traffic engineering of an optical transport network, OTN, according to the first aspect of the present invention does increase the number of advertised TE links, however, the amount of the overall advertised TE information increase is far less than the increase that would have been required to explicitly advertise each individual ODUk container on each of the OTN/ODUk TE links.

Figure 2:
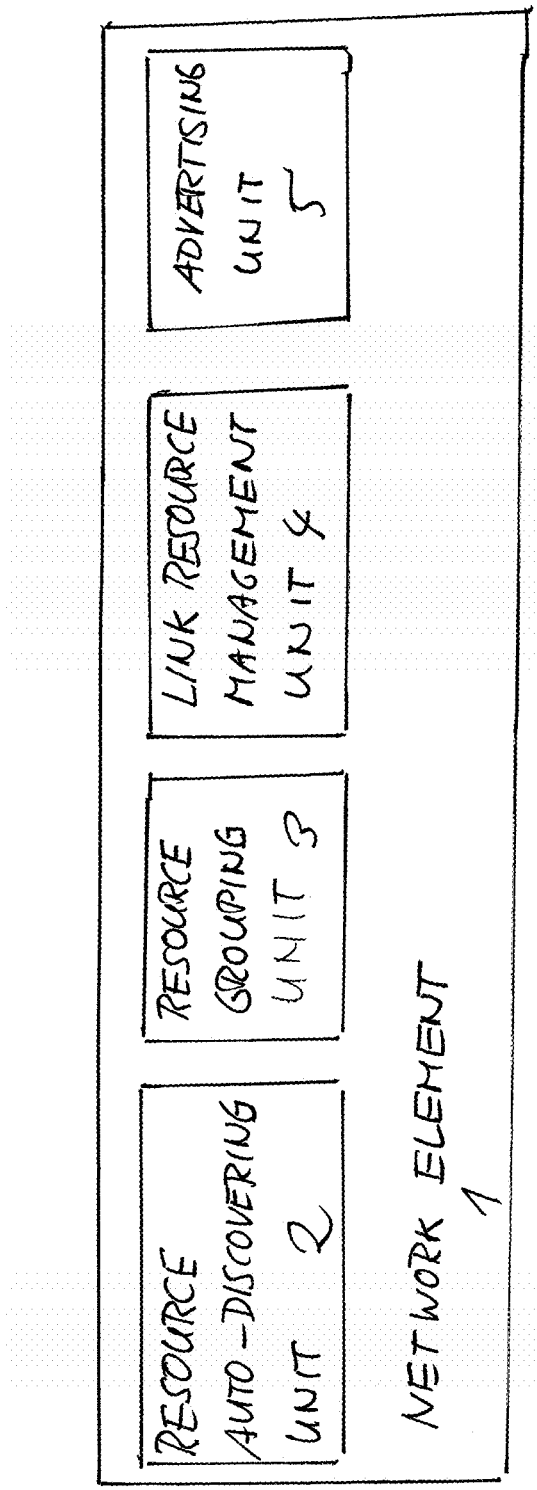
FIG. 2 shows a block diagram of a network element of an OTN network according to the second aspect of the present invention.

FIG. 2 shows a block diagram of a possible exemplary embodiment of a network element, NE, within an OTN network according to the second aspect of the present invention.

The network element 1 according to the second aspect of the present invention comprises a resource auto-discovering unit 2.

The resource auto-discovering unit 2 is adapted to discover ODUk containers available on each of its TE links terminated by said network element 1 and to identify switching limitations of the discovered ODUk containers.

The network element 1 as shown in FIG. 2 further comprises a resource grouping unit 3 adapted to identify groups of ODUk containers exhibiting identical switching limitations.

The network element 1 further comprises in the illustrated embodiment a link resource management unit 4 adapted to negotiate with neighboring network elements properties of to be advertised child TE links terminated by the network element 1.

The network element 1 further comprises an advertising unit 5 adapted to advertise for each identified group of ODUk containers a separate child TE link parallel to the original parent TE link terminated by the network element 1. Each advertised child TE link indicates the total number of available ODUk containers within the respective ODUk group and the identified switching limitations exhibited by the ODUk containers of the ODUk group. Further, the re-advertised parent TE link indicates the number of available ODUk containers reduced to account for the ODUk containers associated with the separately advertised child TE links.

The invention provides according to a further aspect an optical transport network, OTN, comprising a plurality of network elements such as illustrated in FIG. 2 connected to each other via optical fiber links. The optical transport network, OTN, can use an OTN frame as illustrated in FIG. 3. The OTN digital wrapper provides complete transparency for a client signal in flexible ODUk containers. As shown in FIG. 3, a client signal is mapped into the optical payload unit (OPU), wherein the OPU overhead provides information on the type of signal mapped into the payload and the mapping structure.

The ODU overhead adds optical path-level monitoring, alarm indication signals, automatic protection switching bytes, and embedded data communication channels, ECC. The ODU is the basic payload that is electronically groomed and switched within the OTN network.

The optical transport unit (OTU) overhead, OH, can add bytes to provide optical selection layer performance monitoring and alarm indication. The OTU can represent a physical optical interface or port.

The OTUk is an information structure into which another information structure called ODUk is mapped. The ODUk signal is the server layer signal for client signals. The ODUk information structure is defined in ITU-T recommendation G-709.

The invention claimed is:
1. A method for traffic engineering on an optical transport network, OTN, comprising network elements implementing asymmetric OTN switches, said method comprising:

(a) discovering by each network element of said network ODUk containers available on each of locally terminated traffic engineering, TE, links and identifying the switching limitations of the discovered ODUk containers with respect to how said ODUk containers are switchable onto the ODUk containers available on other locally terminated TE links;

(b) identifying by said network element groups of ODUk containers available on a given TE link exhibiting identical switching limitations;

(c) negotiating by said network element with its neighboring network elements properties of to be advertised child TE links each associated with a separate ODUk group; and (d) advertising by said network element for each identified group of ODUk containers a separate child TE link parallel to the original parent TE link, wherein each advertised child TE link indicates the total number of available ODUk containers within the respective ODUk group along with the identified switching limitations exhibited by the ODUk containers of said ODUk group and wherein the re-advertised parent TE link indicates the number of available ODUk containers reduced to account for the ODUk containers associated with the separately advertised child TE links.

2. The method according to claim 1, wherein the child TE links and parent TE links are advertised using an instance of the OSPF-TE or the ISIS-TE protocol.

3. The method according to claim 1, wherein the advertised TE data is stored in a TE database.

4. The method according to claim 3, wherein a service path is computed on the basis of the TE data stored in the TE database.

5. The method according to claim 1, wherein the ODUk containers identify atomic network resources of an ODU layer of said OTN network and the granularity at which bandwidth can be allocated for a given OTN service.

6. The method according to claim 1, wherein the OTN network is controlled by a GMPLS control plane.

7. A network element of an OTN network having TE and data links connecting said network element to other network elements of said OTN network, said network element comprising:

(a) a resource auto-discovering unit adapted to discover ODUk containers available on each of its TE links terminated by said network element and to identify switching limitations of the discovered ODUk containers;

(b) a resource grouping unit adapted to identify groups of ODUk containers exhibiting identical switching limitations;

(c) a link resource management unit adapted to negotiate with neighboring network elements properties of to be advertised child TE links terminated by said network element; and (d) an advertising unit adapted to advertise for each identified group of ODUk containers a separate child TE link parallel to the original parent TE link terminated by said network element, wherein each advertised child TE link indicates the total number of available ODUk containers within the respective ODUk group and the identified switching limitations exhibited by the ODUk containers of said ODUk group and wherein the re-advertised parent TE link indicates the number of available ODUk containers reduced to account for the ODUk containers associated with the separately advertised child TE links.

8. The network element according to claim 7, wherein said ODUk containers are atomic network resources of an ODU layer of said OTN network, wherein said resources define the granularity at which bandwidth can be allocated for the services provided by said OTN network.

9. The network element according to claim 7, wherein said OTN network is controlled by a GMPLS control plane.

10. The network element according to claim 7, wherein said network element is adapted to implement at least one asymmetric OTN switch.

11. The network element according to claim 10, wherein the OTN switch is connected to OTN multiplexers of said network element.

12. An optical transport network, OTN, comprising network elements implementing asymmetric OTN switches, wherein said network element comprises:

(a) a resource auto-discovering unit adapted to discover ODUk containers available on each of its TE links terminated by said network element and to identify switching limitations of the discovered ODUk containers;

(b) a resource grouping unit adapted to identify groups of ODUk containers exhibiting identical switching limitations;

(c) a link resource management unit adapted to negotiate with neighboring network elements properties of to be advertised child TE links terminated by said network element; and (d) an advertising unit adapted to advertise for each identified group of ODUk containers a separate child TE link parallel to the original parent TE link terminated by said network element, wherein each advertised child TE link indicates the total number of available ODUk containers within the respective ODUk group and the identified switching limitations exhibited by the ODUk containers of said ODUk group and wherein the re-advertised parent TE link indicates the number of available ODUk containers reduced to account for the ODUk containers associated with the separately advertised child TE links.

13. The optical transport network, OTN, according to claim 12, wherein said OTN network is controlled by a GMPLS control plane.

* * * * *